United States Patent
Speigle et al.

(10) Patent No.: US 7,064,769 B2
(45) Date of Patent: Jun. 20, 2006

(54) SYSTEMS AND METHODS FOR COMPUTING THE PRESENCE OF SELF-LUMINOUS ELEMENTS IN AN IMAGE

(75) Inventors: Jon M. Speigle, Vancouver, WA (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 189 days.

(21) Appl. No.: 10/677,034

(22) Filed: Sep. 30, 2003

(65) Prior Publication Data

US 2005/0068330 A1   Mar. 31, 2005

(51) Int. Cl.
*G09G 5/02* (2006.01)

(52) U.S. Cl. ..................................... 345/589

(58) Field of Classification Search .................. 345/12, 345/20, 63, 77, 589, 690, 166, 213, 692, 345/693, 694; 348/34, 217.1, 223.1, 297, 348/655, 200, 202, 225.1; 382/274; 386/44
See application file for complete search history.

(56) References Cited

U.S. PATENT DOCUMENTS

| | | | |
|---|---|---|---|
| 4,648,051 A | 3/1987 | Wandell et al. | |
| 4,992,963 A | 2/1991 | Funt et al. | |
| 6,038,339 A | 3/2000 | Hubel et al. | |
| 6,243,133 B1 | 6/2001 | Spaulding et al. | |
| 6,249,601 B1 * | 6/2001 | Kim et al. | 382/162 |
| 6,711,285 B1 * | 3/2004 | Noguchi | 382/162 |

OTHER PUBLICATIONS

Buchsbaum, G. "A Spatial Processor Model for Object Color Perception," J. Franklin Inst., vol. 310, 1980.

Maloney, L.T.; Wandell, B.W. "Color Constancy: a method for recovering surface spectral reflectance", J. Optical Soc. Am. A, vol. 3, pp. 29-33, 1986.

Brainard, D.H.; W. T. "Bayesian color constancy," J. Optical Soc. Am. A, vol. 14, pp. 1393-1411, 1997.

Finlayson, G.D.; Hordley, S.D.; Hubel, P.M. "Color by correlation: a simple, unifying framework for color constancy," IEEE Trans. Pattern Analysis and Machine Intelligence, vol. 23, pp. 1209-1221, 2001.

Finlayson, G.D. Hordley, S.D.; Hubel, P.M. "Unifying color constancy," J. Imaging Science and Technology, vol. 45, pp. 107-116, 2001.

Luo, Jiebo; Etz, Stephen "A Physical Model-Based Approach to Detecting Sky in Photographic Images," IEEE Transaction on Image Processing, vol. 11, No. 3, pp. 201-212, Mar. 2002.

(Continued)

*Primary Examiner*—Matthew C. Bella
*Assistant Examiner*—G. F. Cunningham
(74) *Attorney, Agent, or Firm*—Krieger Intellectual Property, Inc.; Scott C. Krieger

(57) ABSTRACT

Embodiments of the present invention comprise systems and methods for estimating self-luminous image elements and modifying images and image corrections for the presence of self-luminous elements.

11 Claims, 10 Drawing Sheets

OTHER PUBLICATIONS

Maloney, L. T., "Physics-Based Approaches to Modeling Surface Color Perception".

Finlayson, G.D., Color In Perspective, IEEE PAMI, 1996, pp. 1034-1038.

Forsyth, D.A., A Novel Approach to Color Constancy, ICCV88, pp. 9-18.

Swain, M.J. and Ballard, D.H., Color Indexing, IJCV(7), No. 1, Nov. 1991, pp. 11-32.

Rubner, Y., Tomasi, C. and Guibas, L., The Earth Movers Distance as a Metric for Image Retrieval, Technical Report STAN-CS-TN-98-86, Stanford Computer Science Department, Sep. 1998., http://vision.stanford.edu/public/publication/rubner/rubner Tr 98-pdf.

* cited by examiner

SYSTEMS AND METHODS FOR COMPUTING THE PRESENCE OF SELF-LUMINOUS ELEMENTS IN AN IMAGE

TECHNICAL FIELD

The present invention relates generally to digital image processing and more particularly to the detection of aperture colors or self-luminous objects in an image.

BACKGROUND

The reflected light reaching an image sensor is dependent on the light that illuminates the subject matter of the image. Different illuminants will produce different sensor values from the surfaces of the image subject matter. The human visual system approximately compensates these shifts in reflected light to a perceived norm such that surface colors appear color constant. However, when images are captured on media and viewed under a light source different than the source in the image scene, these natural corrections do not take place. Accordingly, it is often desirable for recorded images to be color-balanced to a reference light source in order to appear as they would to the natural eye. This balancing or color correction can be performed once the scene illuminant is identified.

There are many known methods for identification of a light source or illuminant in an image scene. However, the conventional correction algorithms assume that all image pixels represent reflecting surfaces. When an image contains self-luminous objects such as sky and other light sources, the surface-pixel assumption is violated. When an image contains a significant portion of non-reflective, self-luminous objects, conventional methods will fail and the image illuminant will be incorrectly determined. For example, if an image contains blue sky and the color-balance algorithm assumes that all pixels are reflective objects, "bluish" pixels could be taken as evidence that the illumination of the scene is bluish. Because a color correction is approximately the opposite hue of the estimated illuminant, the correction for a bluish illuminant would be to shift the image in a yellowish direction. This correction might produce an overly yellowish ground/surface region and a desaturated sky region.

These color correction, color balance or color constancy algorithms generally do not address the question of how to handle images containing luminous objects, which are also referred to herein as self-luminous objects. They have, rather, focused on images where the surface-pixel assumption is satisfied (e.g., uniformly illuminated Mondrian-like images).

It would be advantageous if a method existed that permitted accurate digital image illuminant corrections to be made for images containing significant exception regions, such as self-luminous regions.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1A:
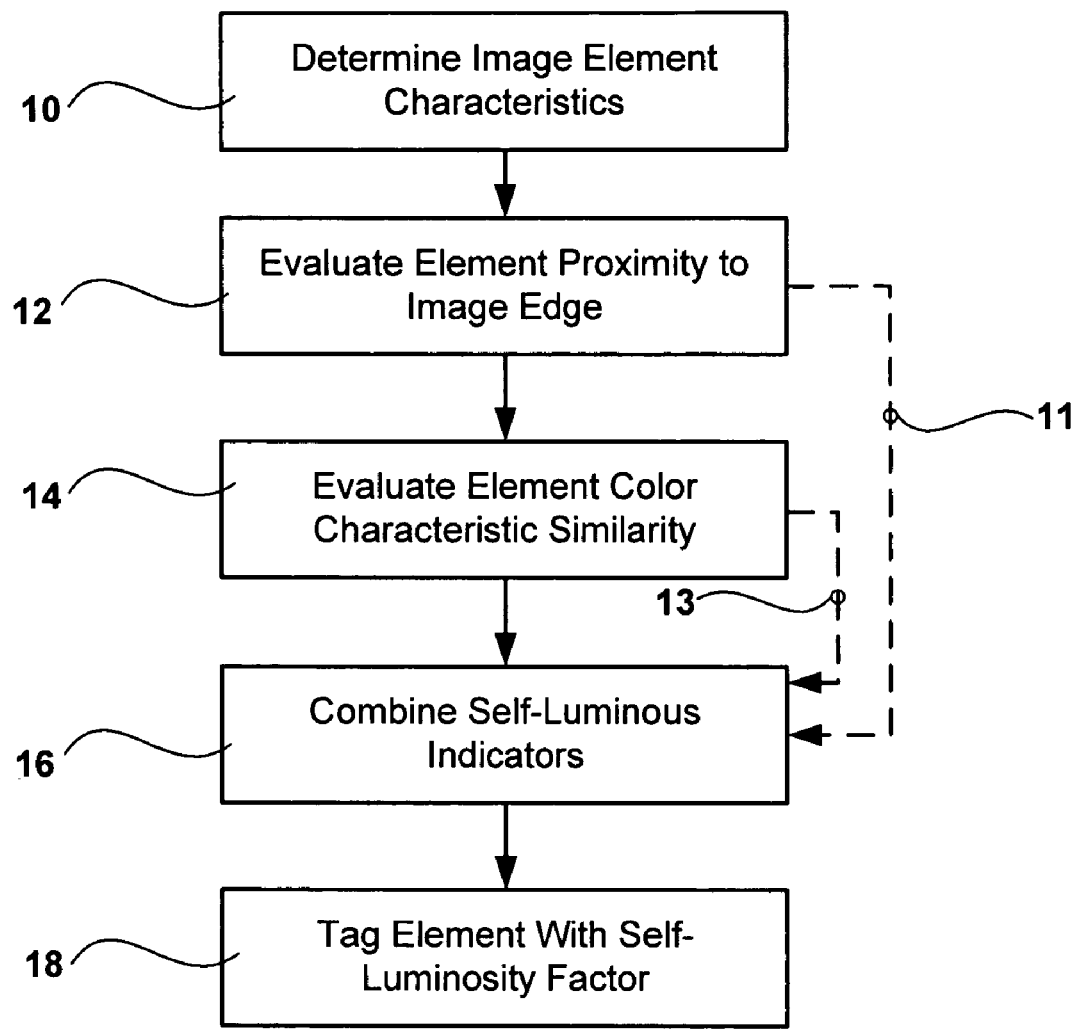
FIG. 1a is a flowchart illustrating methods of self-luminous element detection of some embodiments of the present invention.

In some embodiments of the present invention, methods for determining image self-luminous regions are employed. Digital image correction parameters may be calculated in response to determining the self-luminous regions. Image self-luminous regions can be determined from image feature measures. For example, image feature measures can be pixel color characteristics, pixel luminance and/or pixel position parameters. In some embodiments, self-luminous regions may be determined in response to bright pixel luminance, where bright pixel luminance is defined as relatively bright with respect to surrounding image regions and/or brighter than a threshold brightness.

In some embodiments, self-luminous regions may be determined using a general function of color characteristics with a plurality of terms such as a function of chromaticity, hue angle, color saturation, or brightness.

In other embodiments, self-luminous regions may be determined in relation to the position of pixels with respect to the image edges or other geometric image characteristics.

In many algorithms of embodiments of the present invention, the correction takes the form of a matrix that is applied in a linear colorspace such as the tristimulus values of CIE 1931 XYZ. Input tristimulus values can be multiplied by a matrix to produce a set of color-corrected values as follows:

$$x' = M \cdot x$$

where x is a vector of tristimulus values

M is a color correction matrix x' is the vector of corrected values.

The color correction can be performed in other color spaces, including linear transformations of CIE 1931 XYZ or RGB sensor spaces.

One view of color correction is that the critical step is estimating an illuminant for the scene and then from this estimate a correction matrix can be defined. This approach seeks to estimate surface reflectance functions and the illumination at each pixel. The original sensor values can then be mapped to values under a canonical illuminant. This process assumes that the surface-pixel assumption is satisfied.

One method of defining a correction matrix is in terms of linear models for reflectances and illuminants and an estimated illuminant for the scene. After performing a principle components analysis (or singular value decomposition, SVD) on a large set of reflectance or illuminant functions (e.g., those of the matte Munsell chipset or measured daylight power spectra), typical illuminants and surfaces can be approximated using low-dimensional linear models. Functions can then be approximated within the linear model by defining sets of weights:

$$r = B_s w_s$$

$$e = B_e w_e$$

where
- r is a 1-by-nwavelengths vector of approximated reflectance values;
- e is a 1-by-nwavelengths vector of approximated illuminant spectral power values;
- $w_s$ is a set of weights within the surface linear model;
- $w_e$ is a set of weights within the illuminant linear model;
- $B_s$ is a set of linear basis functions for surface reflectance; and,
- $B_e$ is a set of linear basis functions for illuminant spectral power.

Colorspace coordinates, x, can be computed for a reflectance function rendered under an illuminant.

$$x = T E B_s w_s,$$

where
- E is a diagonal [nWavelengths, nWavelengths] matrix representing the illuminant, i.e., $E = \text{diag}(B_e w_e)$.
- T is a matrix representing the conversion from wavelength domain to color coordinates (e.g., CIE 1931 color matching functions or a set of sensor response functions).

This equation for computing sensor values describes the physics of reflecting an illuminant spectral power distribution from a matte reflecting surface and applying the signal to a set of sensors. The dimensions of the bases are [nWavelengths, nBs] and [nWavelengths, nBe].

Given an illuminant estimate for a first scene, it is possible to invert the mapping from color coordinates to surface weights. The surface weights may then be re-rendered under an illuminant in a second scene (e.g., a standard illumination condition such as CIE D6500). The color-corrected values under the second illuminant, x', can be computed as:

$$x' = M \cdot x$$

where
- $M = T E_2 B_s (T E_1 B_s)^{-1}$
- $E_2 = \text{diag}(e_{canonical})$
- $E_1 = \text{diag}(B_E W_E)$
- $e_{canonical}$ is the spectral power distribution of a canonical illuminant.

Some alternative methods of defining a correction matrix impose constraints on the form of the correction. For example, in some methods, the correction matrix must be diagonal rather than fully-populated. In other methods the gain values are defined so as to map a neutral object under the estimated illuminant to neutral values under the reference illuminant. For each form of correction matrix, it is necessary to map from estimated illumination parameters to correction parameters.

Self-luminous or non-reflecting image regions can lead to problems including incorrectly biasing the illuminant estimate or problems in color correction due to violations of the assumptions underlying the color correction transform.

In some embodiments of the present invention, image elements, such as pixels or groups thereof, are evaluated to determine whether they are likely to represent self-luminous objects in the image. These elements may be more likely to be self-luminous when they are located in proximity to the edges of the image. For example, and not by way of limitation, in images that contain regions of sky, a self-luminous area, the self-luminous sky area is typically located along the top edge of the image. When images are rotated, such as from landscape to portrait format, top edges may become side edges and vice versa. Accordingly, in some embodiments of the present invention, proximity to any edge can be an indicator of self-luminance. In other embodiments, image orientation algorithms may be used to identify the top, bottom and sides of an image. In other embodiments, an image may comprise metadata or some other indication of image orientation. In these embodiments with identified orientation, proximity to particular edges may be indicative of self-luminance. For example and not by way of limitation, a pixel's proximity to the top of the image may be more indicative of self-luminance than proximity to the side or bottom of the image.

In some embodiments, an element's likelihood of being self-luminous may be determined in relation to the luminance or brightness of the element. In some embodiments, the output of this function can be viewed as a continuous-tone grayscale image, where lighter regions correspond to regions likely to be self-luminous objects and darker regions correspond to reflecting surfaces.

In some embodiments, an element's chromaticity or color characteristics can be used to determine self-luminance. When an element's chromaticity is similar to the chromaticity of known illuminants or common self-luminous objects, that element is more likely to be self-luminous.

Some embodiments of the present invention comprise the steps illustrated in the chart of FIG. 1a wherein an image element, such as a pixel or region of interest, is evaluated 10 to determine its characteristics such as location, chromaticity or color characteristics and/or luminance value. The location of the element is evaluated 12 to determine its proximity to image edges and, if the element is sufficiently proximate to an edge, a specific edge or some other geometric image boundary the element is considered more likely to be self-luminous and a flag or decision variable value is set 11 or incremented according to this likelihood.

The color characteristics of the element are then evaluated 14 and the element is considered more likely to be self-luminous if the color characteristics match those of known illuminants or self-luminous objects. Color characteristics comprise chromaticity, luminance and other attributes.

When these characteristics indicate a likelihood of being self-luminous, a flag or decision variable value is set 13 according to this likelihood.

These evaluations 12, 14 and the associated flag or decision variable setting may be performed in any order as needed for specific applications. The results of these evaluations can be combined 16, such as by variable addition, Boolean logic or by other methods, and, if sufficient evidence exists, the element can be considered likely to be self-luminous 18.

Figure 1B:
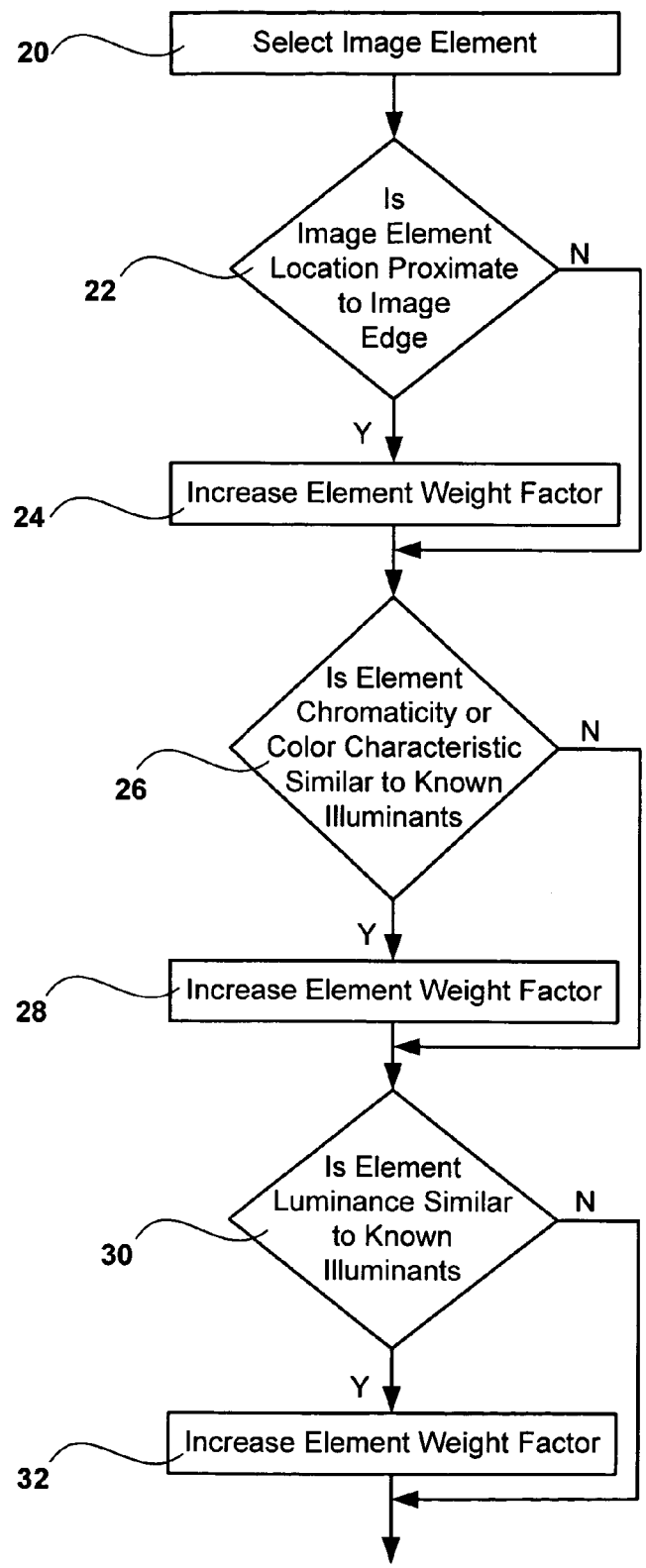
FIG. 1b is a flowchart illustrating methods of self-luminous element detection and element weighting of some embodiments of the present invention.

In other embodiments of the present invention, as illustrated in FIG. 1b, an image element can be evaluated and classified according to a weighting factor or score. In these embodiments, an element is evaluated to determine whether its location is proximate to image edges, specific edges or some other image boundary characteristic. If the location is sufficiently proximate to one of more of these characteristics, the weight factor or score of that element is increased 24 and the element is further evaluated.

If an element's color characteristics are similar to those of known self-luminous objects 26, such as blue sky, overcast sky, tungsten-incandescent light, fluorescent light and others, that element can be considered likely to be self-luminous and the element's weighting factor or score can be increased 28 to reflect this likelihood.

If an element's luminance characteristics are found to be similar to those of known self-luminous objects 30, the weighting factor or score of that element can be increased 32 to reflect a higher likelihood that the element is self-luminous. When the score or weighting factor of an element is sufficiently high, the element may be considered self-luminous.

Figure 2:
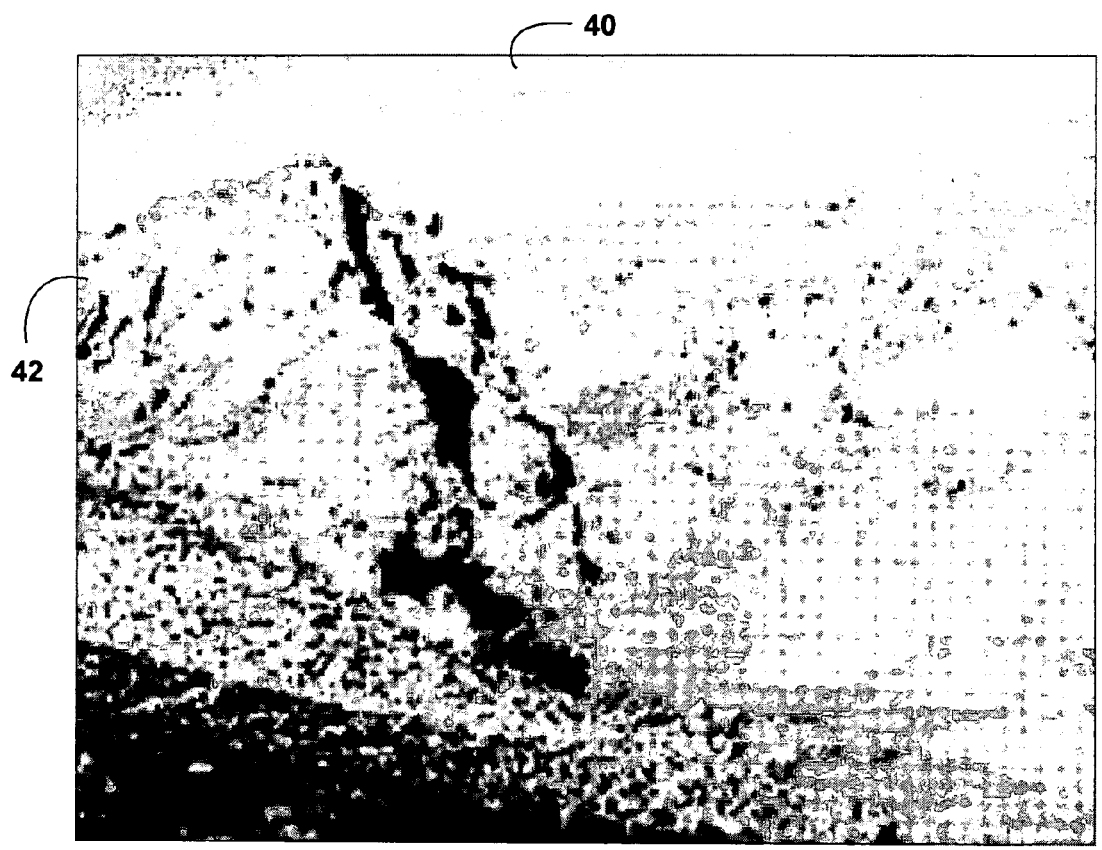
FIG. 2 is a an exemplary image used to illustrate elements of embodiments of the present invention.

The methods of some embodiments of the present invention may be illustrated with reference to FIG. 2, which is an original digital image and FIGS. 3a–3d, which is a set of images derived from FIG. 2 depicting the likelihood of self-luminosity based on element location, chromaticity or color characteristics, and/or luminance parameters. In the images in FIGS. 3a–3d, white areas represent areas of high likelihood, while black areas represent low likelihood.

In some embodiments of the present invention, the self-luminous decision variable, s, can be computed from the pixel color values, x, and pixel position, (i,j), as:

$$s=f(x,i,j)$$

In some embodiments, independence between the factors can also be assumed. This is convenient computationally at the expense of not taking advantage of correlations between terms (e.g., that sky is likely to be both bluish and of high luminance).

$$s=g(x)*h(i,j)$$

The term dependent on color values can be decomposed into separable terms based on chromaticity, c, and luminance, Y:

$$s=g_1(c)*g_2(Y)*h(i,j)$$

For $g_1(c)$, a function can be designed that has a maximum at the hue angle of "blue sky" and that decreases as the hue angle deviates from this value. We base $g_2(Y)$ on luminance distributions for a large number of sky regions. For h(i,j), the simple assumption can be made that sky is more likely near the edges of the image. Here h(i,j) is a linear function of pixel row number. Note that these choices for $g_1(C)$ and $g_2(Y)$ strongly bias the model toward identifying regions of "blue sky" or another illuminant or group of illuminants as self-luminous objects.

FIG. 2 is an image containing surface regions 42 and sky regions 40. FIG. 3 illustrates a decision variable map for each self-luminosity likelihood function. We use "xy" to denote chromaticity and "Y" to denote luminance, after the CEE 1931 xyY colorspace. In the ground regions, the final decision variable is near zero as illustrated by the black color in all four images in FIGS. 3a–3d.

Figure 3D:
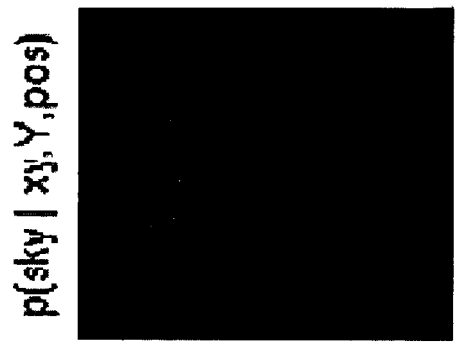
FIG. 3d is an image illustrating a combined likelihood of being self-luminous based on the combination of factors illustrated in FIGS. 3a, 3b and 3c.
Figure 3C:
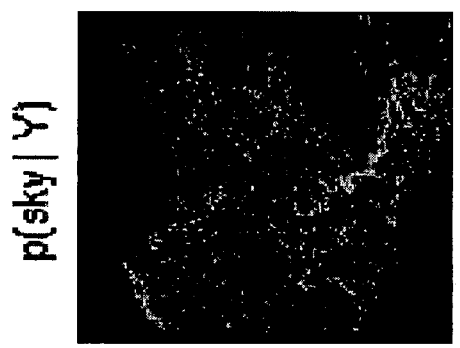
FIG. 3c is an image illustrating a likelihood of being self-luminous based on luminance characteristics.
Figure 3B:
FIG. 3b is an image illustrating a likelihood of being self-luminous based on color characteristics.
Figure 3A:
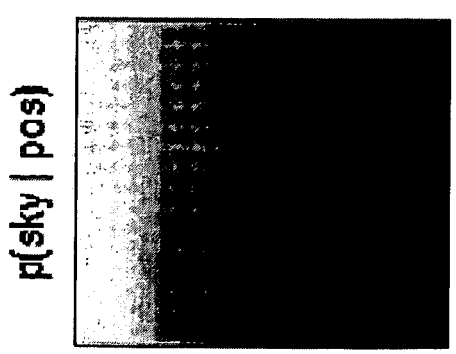
FIG. 3a is an image illustrating a likelihood of being self-luminous based on pixel position relative to an image boundary.

In FIG. 3a, the likelihood of an element being self-luminous near the top edge of the image is shown by the lighter shading that gets progressively darker as the location becomes more distant from the top edge.

In FIG. 3b, the elements or pixels that have chrominance similar to "blue sky" or another illuminant or group of illuminants are shown in white, while those "distant" from that range of hues are shown in darker shades.

In FIG. 3c, the elements or pixels that have luminance values similar to those of known self-luminous objects are shown in lighter shades. In this exemplary image case, few pixels have high luminance as the sky in this image is relatively dark.

FIG. 3d shows a composite image representing a combination of images shown in FIGS. 3a–3c. In this figure, only elements in the sky are shown in lighter shades thereby signifying a successful application of the combined analysis.

Figure 4:
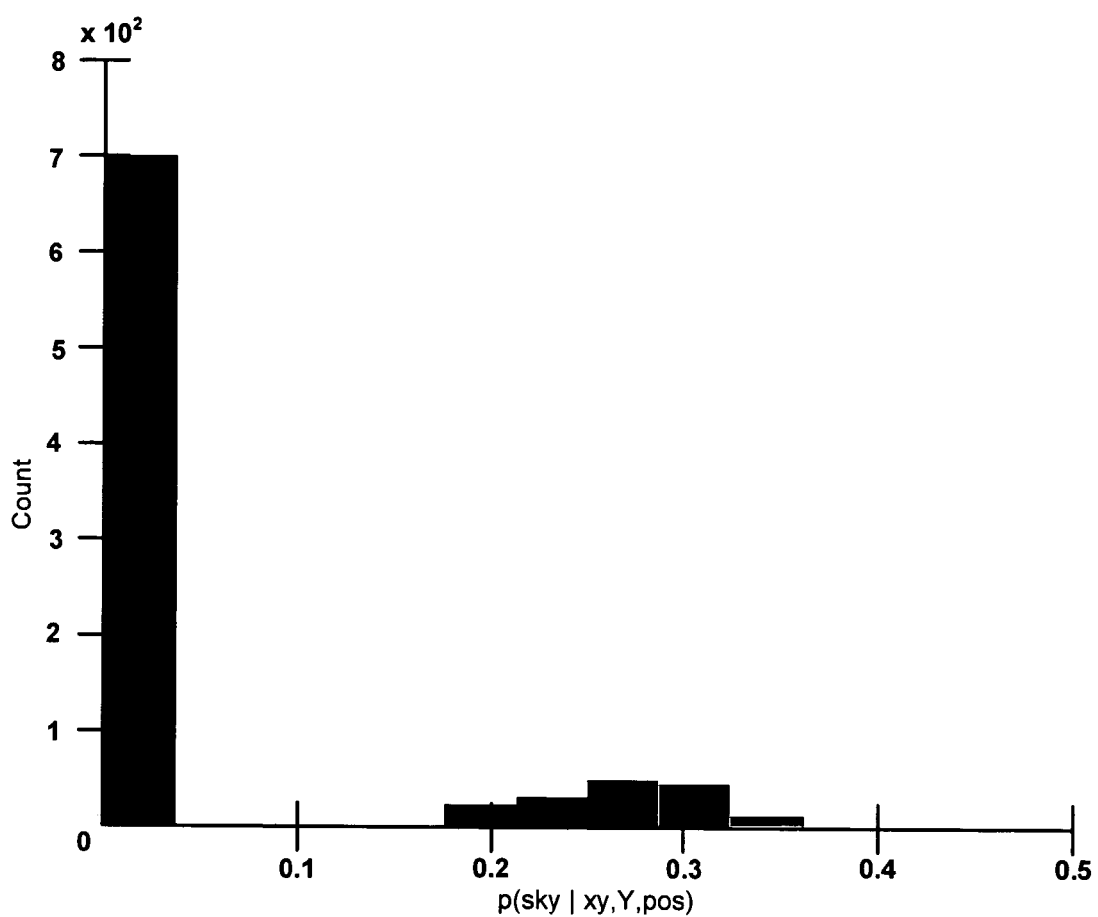
FIG. 4 is a diagram illustrating an exemplary self-luminous probability distribution

FIG. 4 is a diagram illustrating the distribution of self-luminosity decision variables corresponding to FIG. 3d. The "sky" region corresponds to the values in the 0.2–0.35 range.

Figure 5:
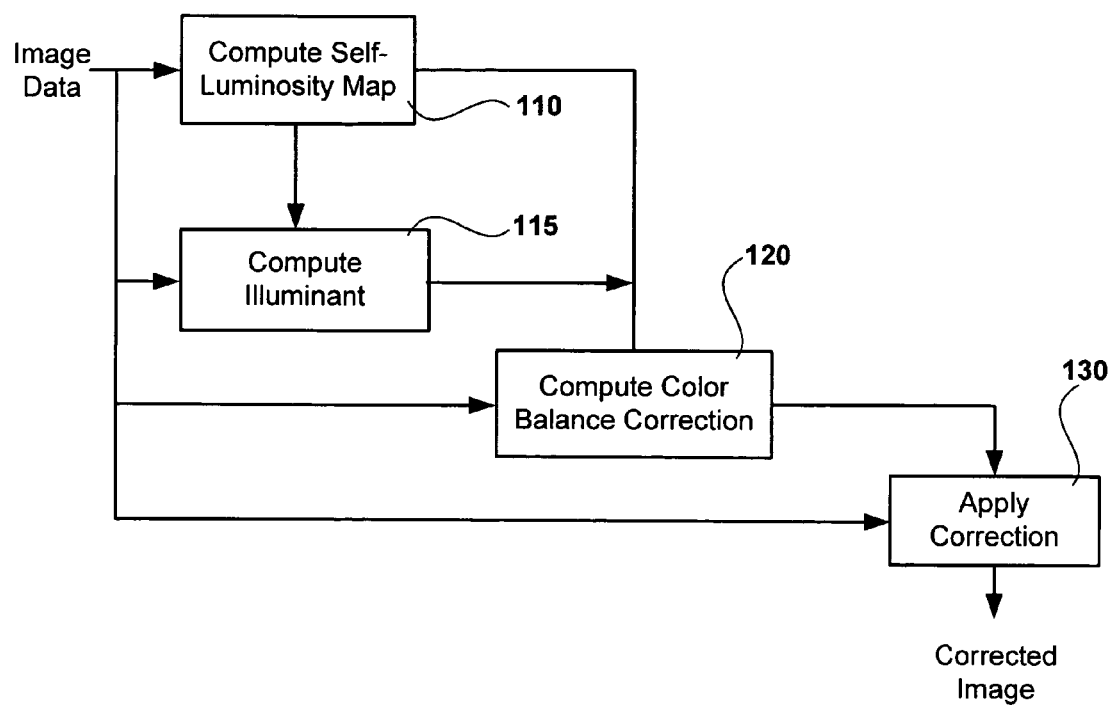
FIG. 5 is a flowchart illustrating some steps of embodiments of the present invention.

Embodiments of the present invention may be used in conjunction with color balance or color constancy estimation methods and color balance correction in digital images. In some embodiments of the present invention, as shown in FIG. 5, inventive methods and systems may be used to determine self-luminous elements 110. These methods and systems may further influence the determination of an image illuminant 115 and the correction used to achieve color balance 120. These systems and methods may also have an effect on the application of the color balance correction 130.

Most color-balance algorithms can be modified to use a self-luminous classification map to derive color-balance parameter estimates from only those pixels classified as non-self-luminous. These modified algorithms would produce estimates with reduced bias due to the presence of self-luminous image regions.

For example, a greyworld algorithm can be modified to compute a weighted average of the scene chromaticities where the weight would be reduced for pixels likely to be self-luminous.

Consider the illuminant estimation method that selects the illuminant parameters $e_i$ such that the function $f(e_i)$ is maximized for the image, I:

$$f(e_i)=\Sigma p(x_k|I, S_k=0)*p(x_k|e_i)$$

where
  $x_k$ represents a vector of color values
  $S_k$ represents a binary variable indicating the state of self-luminous (S=1) or surface (S=0)
  $e_i$ represents a set of parameters for the ith illuminant $p(x_k|I, S_k=0)$ represents the likelihood of observing color coordinates $x_k$ in an image, I, for the non-self-luminous pixels. $p(x_k|e_i)$ represents the likelihood of observing color coordinates $x_k$ under illuminant $e_i$. This term represents a scene/image color probability model that is indexed by illuminant. When the color frequencies observed in the image match the color frequencies expected under a particular illuminant, the value f will be large. The illuminant corresponding to the maximum of $f(e_i)$ is the illuminant most consistent with the surface pixels in the image. For a discrete set of color coordinates, the observed color likelihood function can be approximated as:

$$p(x_k|I, S=0) = n_k/N_{S=0}$$

where $n_k$ represents the number of surface pixels within a distance $\epsilon$ of coordinate $x_k$ $N_{S=0}$ is the number of pixels in the surface class An alternative method of estimating an illuminant from an image, I, is to directly use the self-luminous decision variable rather than a classification map. Consider the illuminant estimation method that selects the illuminant parameters $e_i$ such that the function $g(e_i)$ is maximized:

$$g(e_i) = \Sigma w_k * p(x_k|e_i)$$

where $w_k$ represents a weight for a kth vector of color values that is dependent on the corresponding self-luminous decision variable The value $w_k$ may be computed from pixel self-luminous decision variable, s:

$$w_k = 1-s$$

where s is normalized to have range 0–1.

$p(x_k|e_i)$ represents the likelihood of observing color coordinates $x_k$ under illuminant $e_i$. The term $w_k$ weights the contributions of pixels that are non-self-luminous more than pixels that are self-luminous. Thus the value $g(e_i)$ will be a measure of how consistent illuminant $e_i$ is with the surface pixels in the image.

For a discrete set of color coordinates, the weight may be computed as:

$$w_k = \Sigma w_j$$

where j indexes over the pixels within a distance $\epsilon$ of coordinate $x_k$ In some embodiments, Bayesian color balance estimation techniques formulate the problem as selecting the illuminant, $e_i$, that maximizes the illuminant posterior probability distribution, $p(e_i|I)$, of the illuminant parameters conditioned on the image data. Bayes' Law relates the posterior to the prior, $p(e_i)$, and image likelihood function, $p(I|e_i)$:

$$p(e_i|I) = k \cdot p(I|e_i) \cdot p(e_i)$$

where k is a normalizing constant $p(e_i)$ represents the likelihood of different illuminants $p(I|e_i)$ represents the likelihood the image was illuminated by illuminant $e_i$.

If pixels are assumed independent from one another, then the color likelihood of the image is the product of the likelihoods of each pixel's color values, $x_j$, given the illuminant:

$$p(I|e_i) = \Pi p(x_j|e_i)$$

One method of introducing a self-luminous classification map into the pixel likelihood function is to let a binary variable S indicate that a pixel is self-luminous (S=1) or non-self-luminous (S=0). The color likelihood function is equal to, $$p(x_j|e_i) = p(x_j|e_i, S=0)p(S=0) + p(x_j|e_i, S=1)p(S=1)$$

For the case where a pixel is self-luminous, the color likelihood function can be treated as conditionally independent of the illuminant:

$$p(x_j|e_i, S=1) = p(x_j|S=1)$$

where $p(x_j|S=1)$ is a probabilistic model for self-luminous regions

Substituting, the image likelihood is computable as:

$$p(I|e_i) = \Pi\{p(x_j|e_i, S=0)p(S=0) + p(x_j|S=1)p(S=1)\}$$

From the image likelihood function, the illuminant posterior distribution may be computed and then maximized to yield an illuminant estimate.

In some embodiments, the posterior, $p(e_i|I)$, may be computed by multiplying the image likelihood and illuminant prior. The prior, $p(e_i)$, may be used to account for the relative likelihood of different illuminants; for instance, illuminants may be expected to be near the daylight locus.

In some embodiments, a cost function may be used and computed by multiplying the posterior by a function, which biases the result toward a reference illuminant (such as CE D6500). A bias toward a reference illuminant can be useful because corrections associated with extreme estimated illuminants can produce undesirable resultant images if the illuminant estimate is in error.

The illuminant estimate may be the illuminant associated with the maximum after applying the cost function.

The color likelihood function given the illuminant parameters, $p(x_j|e_i)$, is computed by making assumptions or measurements of the distributions of colors in scenes. The purpose of this term is to characterize the likelihood of different colors under each illuminant. For example, under a reddish illuminant chromaticities with a nominally reddish hue would be more likely and nominally bluish chromaticities would be highly unlikely.

Figure 6:
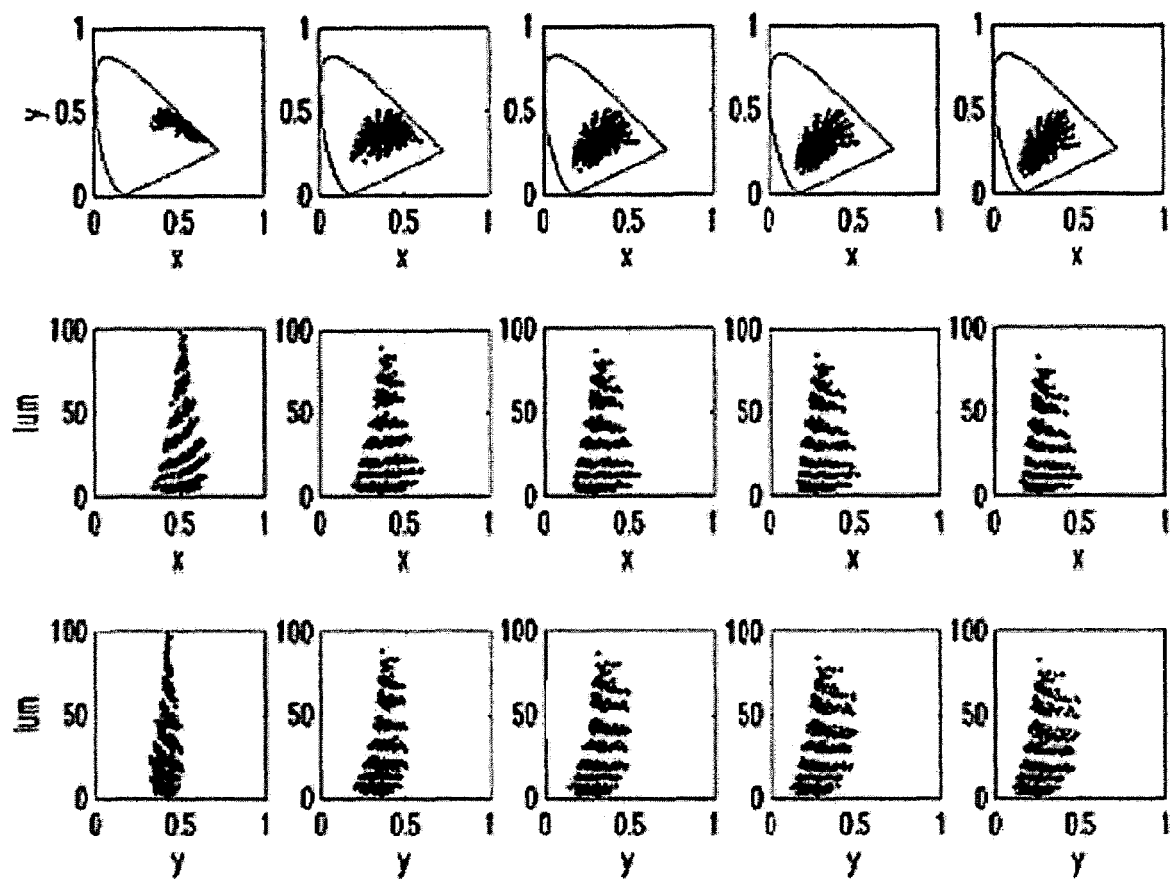
FIG. 6 is a diagram illustrating the various color distributions reflected from selected illuminants.

FIG. 6 illustrates how a set of matte Munsell surfaces shifts under a set of illuminants that are near the daylight locus. Each column of plots corresponds to a different illuminant.

Figure 7:
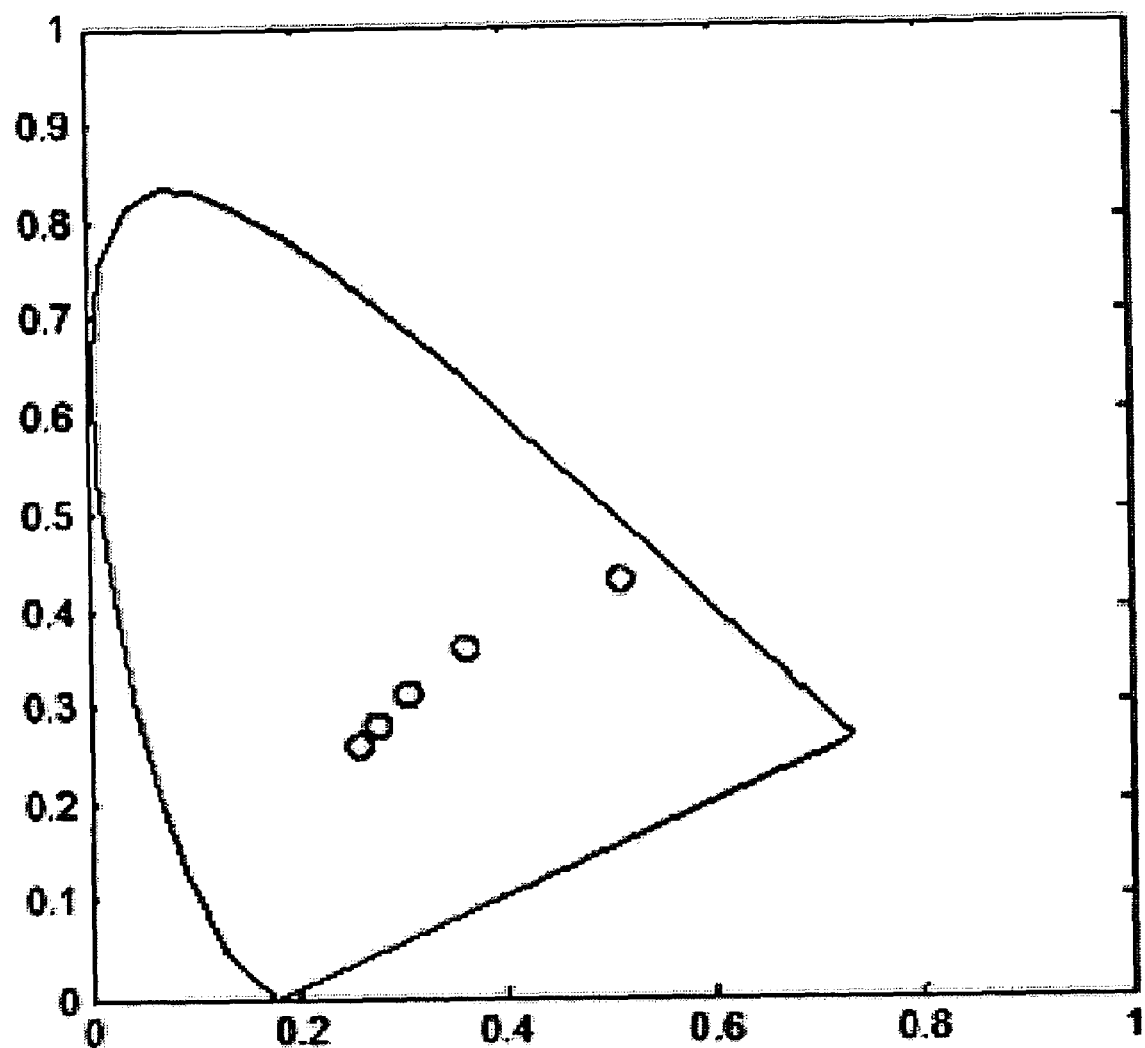
FIG. 7 is a diagram illustrating the chromaticities of the illuminants shown in FIG. 6.

FIG. 7 illustrates the chromaticities of the illuminants depicted in FIG. 6. The color of these illuminants varies in a bluish-yellowish direction and there is a clear shift in the chromaticities of the Munsell set with each illuminant. One method of computing $p(x_j|e_i)$ is to assume that colors in images are uniformly drawn (with replacement) from the set of Munsell matte patches. The long-term average color frequencies will be the same as rendering the Munsell set under the illuminant. The probability of a given chromaticity, [x,y], under the ith illuminant will simply be the frequency at that chromaticity of the distribution of the Munsell set under that illuminant. An alternative method is to derive an emprical color model from the surface color distributions across a large collection of images or objects.

In some embodiments of the present invention, a likelihood of occurrence of specific colors may be pre-computed for a set of illuminants. These may be referred to as model gamuts, $p(\text{chromaticity}|e_i)$. The model gamuts represent the probability of occurrence of each chromaticity given the illuminant.

The probability of being self-luminous is computed for each pixel, $p(S=1|\text{chromaticity, luminance, position})$. This probability is based on the pixel's position in the image, its luminance, and its chromaticity or color characteristics. The inverse values, $p(S=0|\text{chromaticity, luminance, position})$, are accumulated as a function of chromaticity. The result of this accumulation is a histogram of p(S=0) as a function of chromaticity, h(chromaticity).

In some embodiments, the image likelihood, $p(I|e_i)$, may be approximated as the inner product between h(chromaticity) and $p(chromaticity|e_i)$. The image likelihood is computed for each illuminant. Across all illuminants, this is a function of illuminant chromaticity, L(chromaticity).

Figure 8:
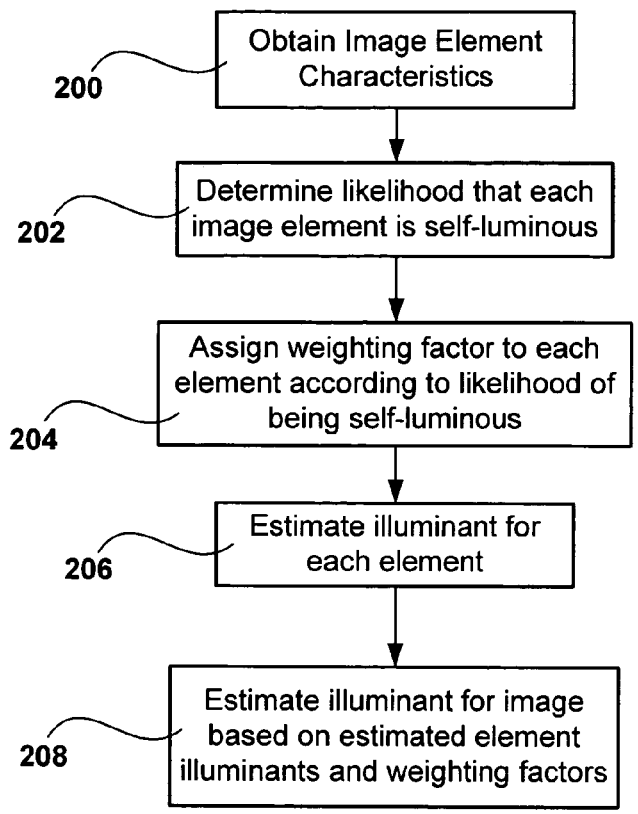
FIG. 8 is a flowchart illustrating methods of embodiments employing a weighting factor related to a likelihood of being self-luminous.

Some embodiments of the present invention may be explained with reference to FIG. 8, which is a flowchart illustrating the steps of an image illuminant estimation process. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. Initially, image element characteristics are obtained 200. These characteristics typically comprise image element color characteristics, luminance characteristics and location data as well as other characteristics. Using the element characteristic data, the likelihood that each image element is self-luminous can be determined 202. This may be performed as explained in other embodiments above with reference to image element proximity to image edges or boundaries, to element chromaticity relative to chromaticity of known illuminants and to element luminance.

A weighting factor may be assigned 204 to each element based on its likelihood of being self-luminous. The most likely illuminant is then estimated 206 for each element based on element characteristics. The image illuminant is then estimated 208 using image element characteristics and the weighting factors. The image illuminant may be estimated 208 in many ways according to the methods of embodiments of the present invention. In some embodiments, the weighting factor may be used to adjust the contribution of elements to the image illuminant estimation process. This adjustment may comprise complete omission of likely self-luminous elements or diminution of their contribution to the estimation process.

Figure 9:
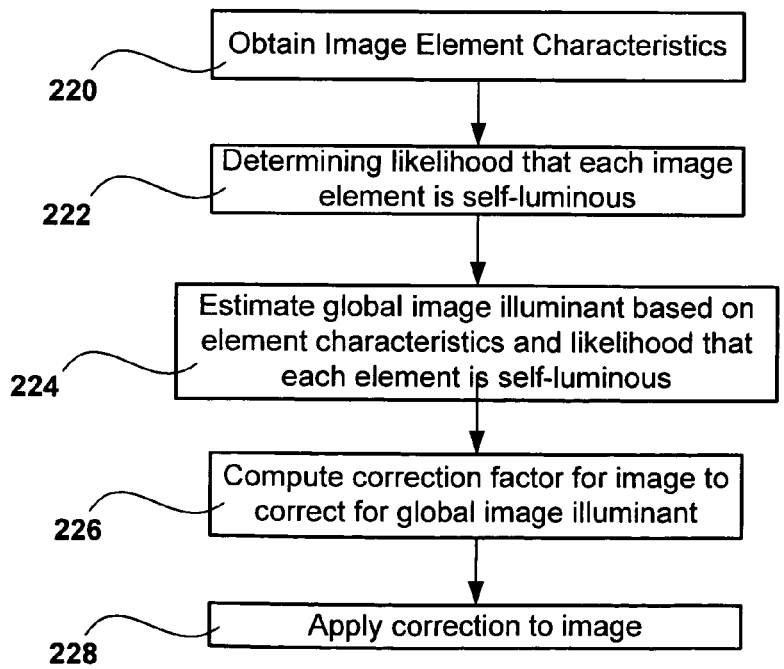
FIG. 9 is a flowchart illustrating methods of embodiments employing a correction factor.

Other embodiments of the present invention may be explained with reference to FIG. 9, which is a flow chart showing an image color-balance correction process. In these embodiments, image element characteristics are obtained 220 in a typical manner as is known in the art. A likelihood that each image element is self-luminous is then determined 222 according to methods explained herein. A global image illuminant is estimated 224 for the entire image based on image element characteristics and the likelihood that each element is self-luminous. A correction factor is then computed 226 to color-balance the image for the illuminant that has been estimated. This correction factor is then applied to the image 228 to achieve proper color-balance.

Figure 10:
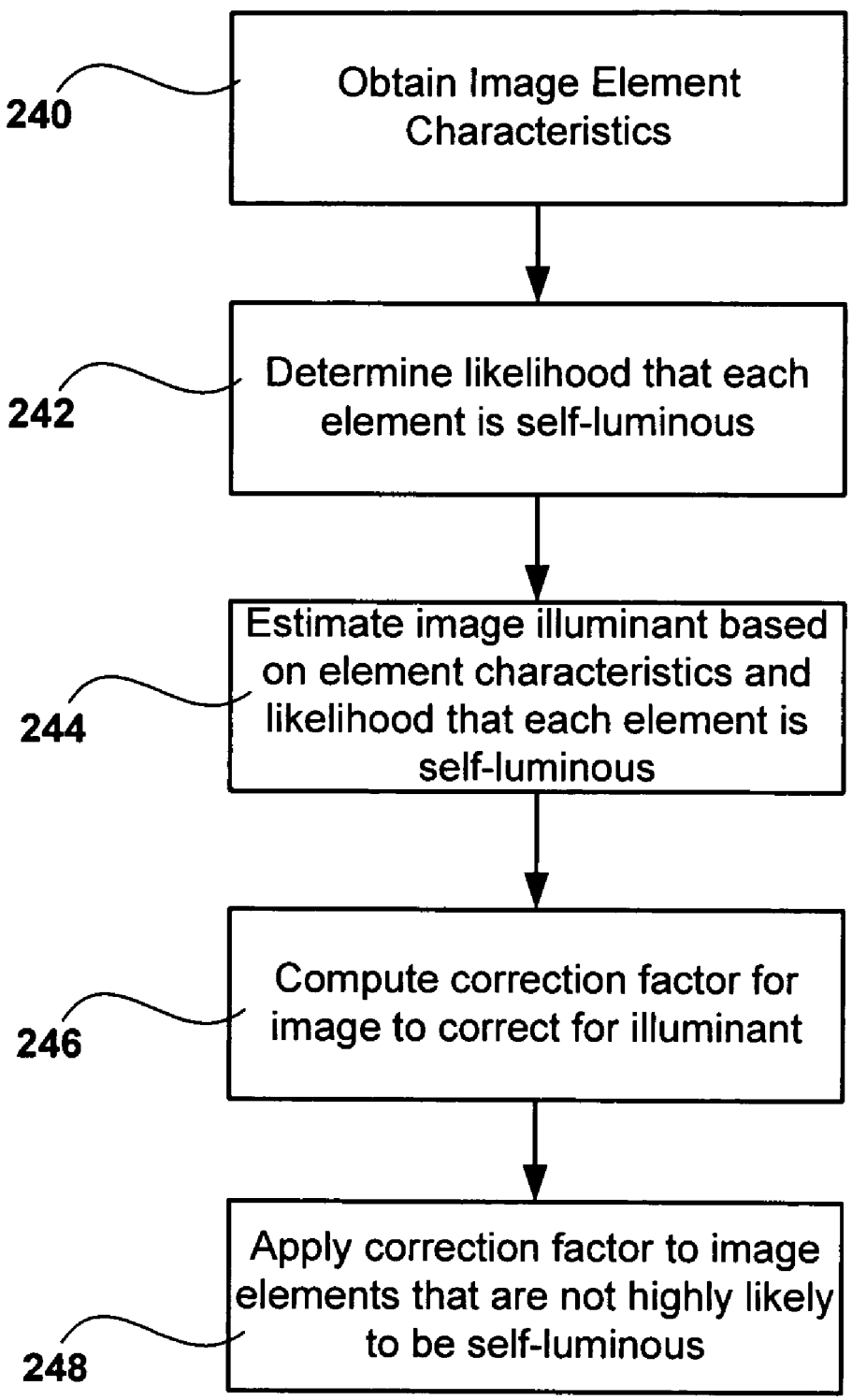
FIG. 10 is a flowchart illustrating methods of embodiments wherein self-luminous elements are distinguished during correction.

Other embodiments of the present invention may be explained with reference to FIG. 10, which is a flow chart illustrating a method for selective application of a color-balance correction factor. In these embodiments, image element characteristics are obtained 240 by methods known in the art. A likelihood that each element is self-luminous is determined 242 as explained above and an image illuminant is estimated 244 based on the element characteristics and the likelihood that each element is self-luminous. One or more correction factors are computed 246 to correct the image for the illuminant and the correction factor or factors are applied to the image 248 according to each element's likelihood of being self-luminous. In these embodiments, the correction factor may be applied only to elements that are not likely to be self-luminous, may be applied in degrees according to magnitude of the likelihood of being self-luminous or may be applied in other ways that are proportional or otherwise related to the likelihood of an element being self-luminous.

Systems and methods for determining a likelihood of an image element being self-luminous, computing correction parameters and applying digital image correction parameters have been explained herein. A few examples have been given to illustrate and clarify aspects of the invention. However, the invention is not limited to merely these examples. Specific correction algorithms have also been given to provide a context for the invention, but again, the invention is not limited to just the mentioned algorithms. Other variations and embodiments of the invention will occur to those skilled in the art.

What is claimed is:

1. A method for determining that an image element is likely to be self-luminous, the method comprising:
 a. determining image element characteristics;
 b. analyzing said image element characteristics;
 c. assigning a self-luminosity weight factor to said image element when said image element characteristics indicate a likelihood of self-luminosity;
 d. determining the spatial proximity of said image element to an image spatial boundary;
 e. modifying said self-luminosity weight factor when said image element is spatially proximate to said image boundary; and
 f. estimating a color balance correction for at least a portion of said image wherein said correction is based on said weight factor.

2. A method for determining that an image element is likely to be self-luminous, the method comprising:
 a. determining image element characteristics;
 b. comparing the color characteristics of said image element to those found under a known illuminant;
 c. comparing the luminance characteristics of said image element to those found under a known illuminant;
 d. determining the spatial proximity of said image element to an image spatial boundary; and
 e. classifying said image element as likely to be self-luminous when said color characteristics, said luminance characteristics and said spatial proximity meet a criteria on for self-luminous elements.

3. A method as described in claim 2 wherein said image spatial boundary is the top edge of said image.

4. A method for estimating the illuminant of an image, the method comprising:
 a. determining image element characteristics;
 b. assigning a weighting factor to each image element according to its likelihood of being self-luminous, said likelihood being based on said characteristics;
 c. modifying said weighting factor based on the spatial proximity of said each image element to an image spatial boundary;
 d. estimating illuminants for a plurality of image elements;
 e. estimating an image illuminant based on said illuminants for each image element adjusted by said weighting factors.

5. A method as described in claim 4 wherein the effect of said weighting factor is proportional to the likelihood that an image element is non-self-luminous.

6. A method of correcting color-balance in an image, the method comprising:
 a. obtaining image element characteristics for an image;

b. assigning a weighting factor to each image element according to its likelihood of being self-luminous
c. determining an element illuminant for each of said image elements;
d. estimating an image illuminant based on said element illuminants adjusted by their corresponding weighting factors; and
e. correcting image color-balance based on said image illuminant.

7. A method as described in claim 6 wherein said correcting comprises:
a. correcting image elements that are not likely to be self-luminous; and
b. omitting said correcting image color-balance for image elements that are likely to be self-luminous.

8. A method as described in claim 6 wherein said correcting comprises:
a. correcting said image elements according to their likelihood of being self-luminous wherein a full correction is applied to elements that are least likely to be self-luminous, no correction is applied to elements that are most likely to be self-luminous and a partial correction is applied to elements that fall between these limits.

9. A set of computer-executable instructions for determining that digital image pixel is likely to be self-luminous, the method comprising:
a. determining image pixel characteristics;
b. comparing the characteristics of said image pixel to those for known self-luminous pixels wherein said comparing comprises:
(i) comparing the spatial proximity of said image pixel to image spatial boundaries,
(ii) comparing the color characteristics of said image pixel to those of known a illuminant, and
(iii) comparing the luminance characteristics of said image pixel to those of known self-luminous pixels, and
c. classifying said image pixel as likely to be self-luminous when said proximity, said color characteristics and said luminance characteristics meet a criteria for self-luminous pixels.

10. A computer system for determining that an image element is likely to be self-luminous, the system comprising:
a. a storage for storing image element characteristics;
b. a processor for comparing the characteristics of said image element to those for known self-luminous elements wherein said comparing comprises:
i. comparing the spatial proximity of said image element to image spatial boundaries,
ii. comparing the color characteristics of said image element to those of known illuminants, and
iii. comparing the luminance characteristics of said image element to those of known self-luminous elements, and
c. a classifier for classifying said image element as likely to be self-luminous when said proximity, said color characteristics and said luminance characteristics meet a criteria for self-luminous elements.

11. A method as described in claim 6 further comprising modifying said weighting factor when the spatial location of said image element is proximate to an image spatial boundary.

* * * * *